(Model.)

R. F. TALIAFERRO & E. P. MITCHELL.
TWO WHEELED VEHICLE.

No. 310,746. Patented Jan. 13, 1885.

WITNESSES:
Gustave Dietrich
Fred Huetwohl

INVENTORS:
R. F. Taliaferro
E. P. Mitchell
BY Munn & Co.
ATTORNEYS.

UNITED STATES PATENT OFFICE.

RUBEN F. TALIAFERRO AND EDWARD P. MITCHELL, OF HUENEME, CAL.

TWO-WHEELED VEHICLE.

SPECIFICATION forming part of Letters Patent No. 310,746, dated January 13, 1885.

Application filed April 15, 1884. (Model.)

*To all whom it may concern:*

Be it known that we, RUBEN F. TALIAFERRO and EDWARD P. MITCHELL, of Hueneme, in the county of Ventura and State of California, have invented a new and Improved Vehicle, of which the following is a full, clear, and exact description.

The object of this invention is to provide a device for attaching the shafts of a two-wheeled vehicle to the same, by means of which the shafts can be raised or lowered to any desired height, and the axle, with the springs, &c., attached thereto, be kept plumb.

This invention consists in spring-holders clipped or otherwise secured upon the axle, to which spring-holders, at their rear ends, are pivoted the inner ends of bars secured to the under side of the shafts and extending backward beneath the axle. From the forward ends of the spring-holders arms extend downward each side of the shafts and bars, through which arms bolts can be passed to regulate the position of the shafts with reference to the vehicle, as will be hereinafter more fully described.

Reference is to be had to the accompanying drawings, forming part of this specification, in which similar letters of reference indicate corresponding parts in both the figures.

Figure 1:
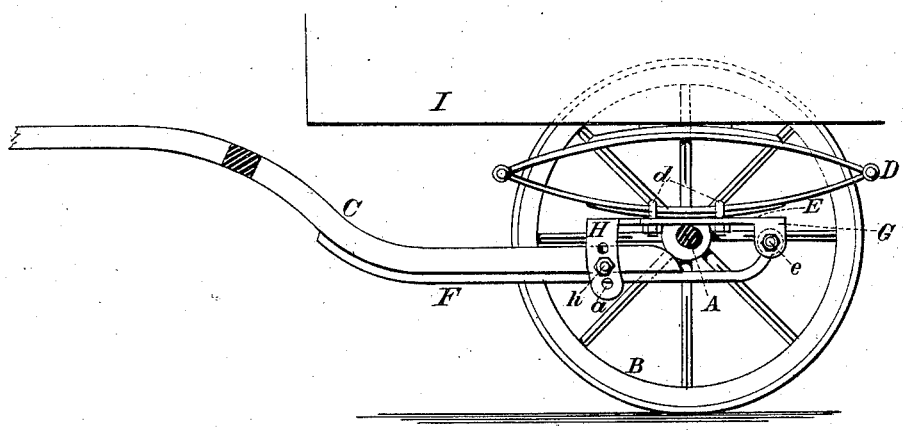
Figure 2:
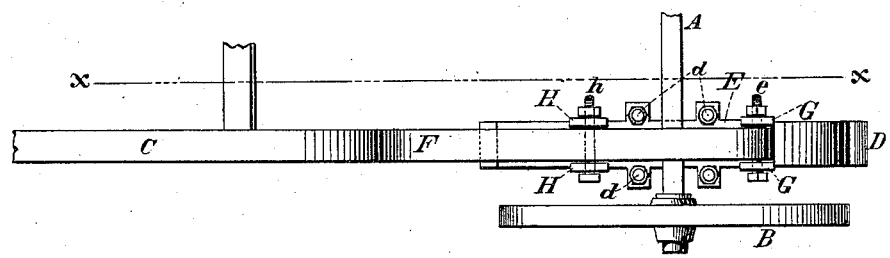

Figure 1 is a sectional side elevation of a two-wheeled cart in part on the line *x x* in Fig. 2, and Fig. 2 is an inverted plan view of the same.

A indicates the axle, B one of the wheels, C one of the shafts, and D one of the springs, of a two-wheeled vehicle. A spring-holder, E, is clipped or otherwise secured about midway of its length upon the upper side of the axle A. A bar, F, is secured to the under side of the shaft C, which bar extends backward beneath the axle, and is bent upward at the end and pivoted between downwardly-extending lugs G of the spring-holder E by a bolt, *e*, passing through the said lugs, and an eye formed in the end of the bar F. Two arms, H, which arms are curved on a circle the center of which is the pivot-bolt *e*, extend downward from the forward end of the spring-holder, between which arms the bar F and the inner end of the shaft C pass, and are held in any desired position vertically by a bolt, *h*, which is passed through one of a series of holes, *a*, in the arms H and through the shaft C. The spring D is clipped to the spring-holder at *d*, and the cart-body I is secured upon the spring-holder in the usual manner. With this device for attaching the shafts of a two-wheeled vehicle to the axle the shafts can be regulated to any required height by adjusting the bolt *h* in any of the holes *a*, and the axle, springs, and vehicle can be kept level. The spring can be attached to the spring-holder at the side, instead of resting upon it, as shown.

Having thus described our invention, we claim as new and desire to secure by Letters Patent—

1. In a vehicle, the spring-support E, interposed between and in combination with the axle and the spring, and having the shaft connected to its under side, substantially as and for the purpose set forth.

2. In a vehicle, the spring-support E, interposed between and in combination with the spring and axle, said support having its rear end connected to the shaft-bar F, disposed below the axle, the forward end of said spring-support having depending arms H, adjustably connected to the shaft C, substantially as and for the purpose set forth.

RUBEN F. TALIAFERRO.
EDWARD P. MITCHELL.

Witnesses:
WILLIAM F. WILKE,
NATHAN J. STARKS.